Patented Aug. 7, 1951

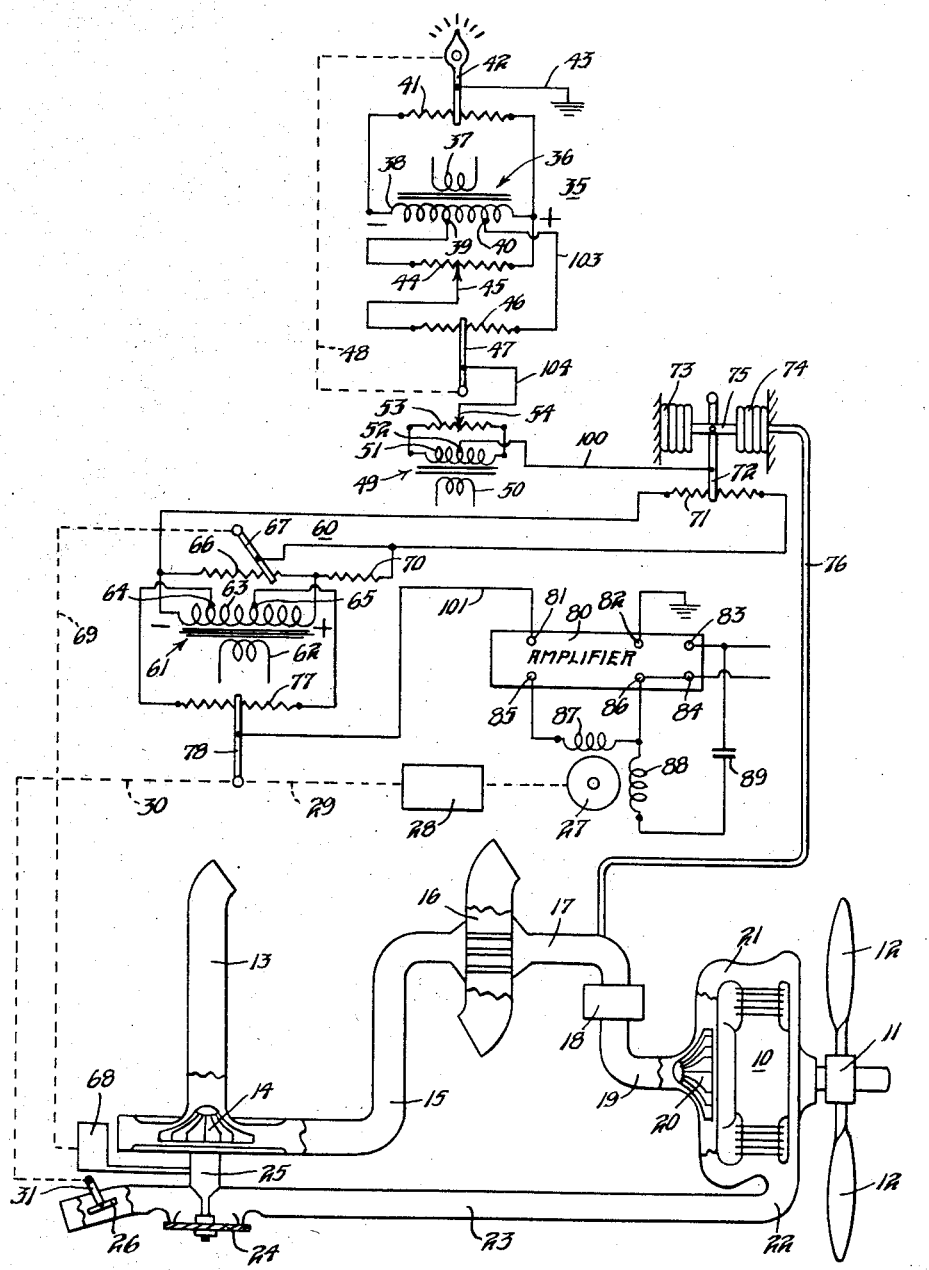

2,562,890

UNITED STATES PATENT OFFICE 2,562,890

CONDITION CONTROL APPARATUS WITH MULTIPOINT CALIBRATION

Alex B. Chudyk, St. Louis Park, Minn., assignor to Minneapolis-Honeywell Regulator Company, Minneapolis, Minn., a corporation of Delaware Application January 26, 1948, Serial No. 4,285

11 Claims. (Cl. 318—29)

1

This invention relates generally to improvements in intake manifold pressure control systems for engines that may be of the internal combustion type, and more particularly with improvements in the calibration of the control system controlling the intake manifold pressure for such engines.

In present day aircraft of the type adapted for flying at high altitudes, it is customary to employ the exhaust gases from the engine to drive a turbine driven air compressor to maintain high powers from the engine at high altitudes. Controlling the volume of air compressed by such a compressor is a waste gate or valve which is variably positioned by an electrical network in accordance with the demand for pressure at some particular point on the intake of the engine. The electrical network generally employed in positioning the waste gate of the compressor control usually consists of manual selecting means, a calibrating network, a pressure sensing device, a turbine overspeed limit device, and a positioning motor for the waste gate all associated with a balanceable electrical network which when operating through an amplifier is operable to position the waste gate in accordance with the demand of any one of the enumerated control devices.

In early types of electrical controls for turbo compressors, it has been customary to provide a calibrating device which insures that the pressure maintained by the compressor is one particular value for a certain setting of the manual selector. This type of calibration would be sufficient if the relationship between movements of the manual slider and the resultant change in flow of air from the compressor was a linear relation. This, however, is not true for when the waste gate makes a linear movement, the flow of exhaust gases past the waste gate is not linear which results in a non-linear flow of air from the compressor.

The present apparatus is concerned with an arrangement for calibrating the electrical control network to give a desired flow of air from the compressor at the two extreme positions of operation of the apparatus. By providing such an arrangement it is possible to more nearly be assured that all operating points between the two calibrated positions are approaching the desired operating condition.

It is therefore an object of the present invention to provide in a condition controlling apparatus a calibration network which fixes the calibration of two points in the operating range of the control apparatus.

A further object of the present invention is to provide in a condition controlling apparatus a calibration network which fixes the calibration of two points in the operating range of the control apparatus and causes the control condition to approach the desired value at all points between the two calibrated points.

A still further object of the present invention is to provide in a condition controlling apparatus a calibration network operatively interconnected with a manual selector to variably adjust the calibration of said control apparatus in accordance with the position of the manual selector.

Still another object of the present invention is to provide an electrical network having therein a pair of electrical circuits interconnected by variable coupling means so that the network will have on its output terminals a signal representative of the sum of the circuits when the coupling means is in one position and a signal representative of one of the circuits when the coupling means is in a second position.

These and other more detailed and specific objects will be disclosed in the course of the following specification, reference being had to the accompanying drawing on which is a diagrammatical showing of a complete engine, induction and exhaust system with a turbo supercharger, and my invention applied to the control system thereof.

Referring to the single figure, the numeral 10 represents an aircraft engine of the radial type which is connected through a drive shaft to a propeller hub 11 to which are attached a plurality of propellers 12. Air for the engine 10 is taken in through a conduit 13 and is compressed by a centrifugal compressor 14 which forces the compressed air through a conduit 15, an intercooler 16, and a conduit 17 to a carburetor 18. The air in the carburetor 18 is mixed with appropriate fuel and is fed through a further conduit 19 to a direct driven compressor 20. The compressor 20 forces the air and fuel mixture into the intake manifold 21 of the engine 10. An exhaust manifold 22 carries the exhaust gases from the engine 10 away from the cylinders through a conduit 23 which in turn carries the gases to an exhaust driven gas turbine 24. The exhaust turbine 24 is coupled to the centrifugal compressor 14 through coupling 25. Controlling the amount of exhaust gas that will flow through the turbine 24 is a waste gate valve 26 which serves to control the by-passing of exhaust gases around the turbine. The valve 26 is positioned by a waste gate motor 27 operating through a suitable gear train 28, couplings 29 and 30 and an actuating arm 31.

Controlling the rotation of the waste gate motor and the resultant positioning of the waste gate 26 is a complex electrical network consisting of two main sections, 35 and 60, connected to form a balanceable electrical network. The output of the electrical network is fed through an amplifier 80 which in turn controls the energization of the waste gate motor 27, as will be explained hereinafter. The amplifier 80 is of the type adapted to amplify alternating current of a frequency corresponding to the frequency of the power source. The phase of the output voltage of the amplifier signal is determined by the phase of the signal voltage on the input terminals of the amplifier. The waste gate motor 27 is of the two-phase reversible type and therefore it is possible to drive the motor in one direction or the other in accordance with the phase of the signals on the energizing windings of the motor.

The network 35 consists of a transformer 36 having a primary winding 37 energized from a common source of power, and a secondary winding 38 having taps at 39 and 40. Connected across the ends of the secondary 38 is a potentiometer 41 having a slider 42 which is actually the manual selector for the control network. The slider 42 is grounded at 43. Also energized by secondary winding 38 is a calibration potentiometer 44 having a variable tap 45. Connected between tap 40 of the secondary 38 and the slider 45 of the potentiometer 44 is a fader potentiometer 46 having a slider 47 mechanically connected to manual selector 42 by any suitable coupling means 48 so that movement of selector 42 will produce a corresponding movement of slider 47. A further calibration transformer is transformer 49 having a primary winding 50 energized by a common source of power and a secondary winding 51 tapped at 52. Energized by the secondary winding 51 is a potentiometer 53 having a variable tap 54. The network 60 may be seen to consist of a power transformer 61 having a primary winding 62 connected to a common source of power, and a secondary winding 63 being tapped at 64 and 65. Connected across the ends of the secondary 63 is an overspeed potentiometer having a slide-wire resistor 66 and a slider 67, the latter being positioned by an overspeed sensing device 68 acting through a coupling 69. Resistor 70 is a by-pass safety resistor to prevent their being an open circuit should the slider 67 accidentally open circuit with its associated slide-wire 66. Should an open circuit occur, the resistor will have the effect of shifting the balance of the control network in a waste gate opening direction in a manner more fully explained in my copending application Serial Number 754,227, filed June 12, 1947. Connected across the overspeed potentiometer between one end of the slider of the potentiometer is a pressure responsive potentiometer network consisting of a slide-wire resistor 71 and a slider 72. The slider 72 is positioned by a pair of bellows 73 and 74 acting through a bellows stem 75 in accordance with the pressure sensed in the intake system of the engine 10 through the duct 76. The numeral 77 represents the slide-wire resistor of the follow up potentiometer of the control network and is energized by the secondary 63 by its connection at taps 64 and 65. The slider 78, associated with the slide-wire 77, is positioned by the rotation of the motor 27 acting through the gear train 28 and coupling 29.

The amplifier 80 has a pair of control signal input terminals 81 and 82. Terminals 83 and 84 are provided for connecting the amplifier to a common alternating current power source. The output terminals 85 and 86 serve to energize the winding 87 associated with the motor 27. The winding 88 of motor 27 is energized directly from the input power line through a phase shifting condenser 89.

Operation

In considering the operation of the subject control apparatus it is necessary to recognize that the control signal which is fed into the amplifier 80 is derived from a number of series connected electrical bridges. The first of these bridges is the manual control bridge located within network 35 and consists of the manual control slide-wire 41 connected across the secondary winding 38. The output terminals for this control bridge are slider 42 and tap 39 and with slider 42 electrically opposite the tap 39, there will be no output voltage across the terminals of the bridge. The next bridge in the series of bridges within network 35 is the calibration bridge which consists of the calibration slide-wire 44 connected between the tap 39 and the right end of the secondary 38. The output terminals of this network are the slider 45 and the tap 40 on secondary 38. When the slider 45 is electrically opposite the tap 40, there will be no output voltage across this calibration brige. If, however, the output is taken across the output terminals of the manual control bridge and the calibration bridge, that is between slider 42 and slider 45, there will be a voltage that will be equal to the voltage existing between tap 39 and 40 assuming that tap 39 is the electrical center of the manual selector bridge and that tap 40 is the electrical center of the calibration bridge. If the polarity of the secondary 38 is as shown with the left end negative and the right end positive this voltage will be a slightly positive voltage.

A further calibration bridge is provided by connecting the slide-wire 53 across the secondary 51. The output terminals of this bridge are slider 54 and tap 52 on secondary 51. With the slider 54 electrically opposite the tap 52, there will be no output voltage across this calibration bridge. Therefore, when the voltage across the manual control bridge and the first described calibration bridge are added in series to that existing across the last described calibration bridge, with the sliders positioned as described, the voltage will be the sum of the voltages of each network plus the voltage that is representative of the displacement of the center of the first calibration bridge from the center of the manual control bridge, on the voltage between taps 39 and 40 of secondary 38. It will be noted that interconnecting the first and second calibration bridges is a further potentiometer or a fader potentiometer whose slide-wire 46 is connected directly across the output terminals of the first calibration bridge at tap 40 and slider 45. The slider 47 of the fader potentiometer is connected to the slider 54 of the second calibration bridge. When the slider 47 is in its extreme left hand position all of the voltage arising from the first calibration bridge is added to that of the second calibration bridge while when the slider 47 is in its extreme right hand position the voltage on the first calibration network will be by-passed since the slider 47 will be connected directly to the tap 40 by conductor 103. The movement of the slider 47 will not have any effect on any voltage arising from the manual control bridge since the slide-wire 46 is connected across only the output terminals of the first calibration bridge. From this it can be seen that with the respective sliders positioned as described the output voltage of network 35 will be slightly positive.

The network 60 also consists of a number of series connected bridges, the first of which is the pressure responsive bridge which consists of slide-wire 71 connected across the ends of secondary 63. Actually the right end of slide-wire 71 is connected to the right end of the secondary 63 through the overspeed slider 67 and normally the right end of slide-wire 66. The functioning of this latter will be explained hereinafter. The output terminals of the pressure responsive bridge are the slider 72 and the electrical center of the secondary 63. With slider 72 electrically opposite the electrical center of secondary 63, there will be no output voltage from the pressure responsive bridge. A further bridge in network 60 is the follow up bridge which consists of slide wire 77 connected to taps 64 and 65 on the secondary winding 63. The output terminals of this bridge are slider 78 and the electrical center between the taps 64 and 65, and with the slider directly opposite the electric center between the taps the follow up bridge will be balanced. The electrical center between the taps is actually selected to be to the left of the electrical center of the secondary 63 so that with both the pressure responsive bridge and the follow up bridge balanced, there will still be a voltage across the network 60 which will be equal to the voltage displacement between the secondary 63 electrical center and the electrical center between the taps 64 and 65. This voltage when measured between slider 72 and slider 78 with the polarity of secondary 63 as shown, with the left end negative and the right end positive, will be slightly negative.

The slightly positive voltage from network 35 when added to the slightly negative voltage from network 60 will equal zero volts assuming all of the respective sliders are in their balanced positions on their respective slide-wires since networks 35 and 60 are electrically connected in series by the conductor 100. The output terminals of the series connected control network are slider 42 and slider 58. The slider 42 is connected to the amplifier input terminal 82 by way of ground conductor 43 while slider 78 is connected to terminal 81 of amplifier 80 by way of conductor 101.

With no output on the output terminals of the electrical control network there will be no input on the input terminals 81 and 82 of the amplifier 80. With no input on the input terminals of the amplifier 80 there will be no output signal fed to the motor winding 87 and therefore the motor 27 will remain stationary.

The amplifier 80 is of the type adapted to amplify alternating current of a frequency corresponding to the common power source and this amplifier will amplify the input signal from the control network and energize the winding 87. The phase of the voltage applied to the winding 87 will be either in phase or 180° out of phase with the input line voltage while the voltage applied to the winding 88 will be 90° displaced from the input line voltage. From this it may be seen that when there is a signal being amplified by the amplifier 80 both of the windings 87 and 88 will be energized so that the voltage on winding 87 will be leading or lagging the voltage on winding 88 by 90 electrical degrees depending on the phase of the signal on the amplifier input Such an arrangement as this makes it possible to have two directional rotation of the motor 27.

Assume now that there is a pressure decrease in the carburetor intake manifold 17 which, for example, may be due to the plane carrying the subject apparatus to a higher altitude. This decrease in pressure would be sensed through conduit 76 by the bellows networks 73 and 74 which would in turn move the coupling link 75 and the slider 72. The slider 72 will be moved toward the right and such movement will unbalance the main control network so that there will be a negative voltage on the output terminals of the control network. With the negative voltage on the input terminals of the amplifier 80 there will be a rotation of the motor 27 in such a direction as to introduce a more positive voltage in the network 60. This positive voltage will be introduced by the movement of the follow up slider 78 which is positioned by motor 27 acting through gear train 28 and coupling 29 and this movement will be toward the right. When the slider 78 is moved to a new position the waste gate 26 is also moved to a new position which will result in changing the speed of the compressor and the volume of the air compressed. This change in volume of air compressed will be sensed by the bellows 74 which in turn will move the slider 72 in a more positive voltage direction or to the right. With slider 72 moved toward the right in a pressure satisfied direction, the network will be unbalanced in the opposite direction and the waste gate motor will in turn be moved back toward the right to the balanced position. Thus the waste gate 26 is adjusted to regulate the speed of the compressor and to maintain a constant carburetor intake pressure.

Assume now that the manual pressure selector slider 42 is moved toward the right. Such movement will unbalance the control network so that a less positive voltage will appear across the network 35 and a negative voltage will appear across the main control network output terminals. This voltage when applied to amplifier 80 will cause the waste gate motor to be rotated in a direction to position slider 78 toward the right to balance out the unbalance created by movement of the manual slider. As the waste gate 26 is positioned at the same time as the slider 78, there will be a change in the speed of the compressor and a resultant change in carburetor induction pressure. This change will move the slider 72 toward the left by an amount that will change the voltage existing across the pressure responsive bridge so that when added to that existing across the follow up bridge the sum will equal the unbalance created by movement of the manual slider 42. From this it can be seen that the pressure selected by the positioning of the manual selector 42 is obtained by the subsequent movement of the waste gate 26 to a position which will result in the driving of compressor 14 at a predetermined speed and that the pressure sensing bellows will maintain the selected pressure at a desired value.

For safety purposes, an overspeed controller 68 is provided to prevent the turbine 24 and the compressor 14 from exceeding a maximum safe rotational speed. Upon the occurrence of an overspeed of the turbine driven compressor the overspeed controller 68 will function to move the slider 67 toward the left across its associated slide-wire 66. The movement of the slider 67 toward the left has the effect upon the control network to reduce the controlling effect of the pressure responsive potentiometer 71 and slider 72 and to shift the balance point of the control network in a waste gate opening direction. In other words, the movement of the slider 67 toward the left will cause there to be a less negative voltage to exist across the control network 60 which will be sensed by the amplifier 80, the latter of which will drive the motor 27 in a direction to open the waste gate 26 and reposition the slider 78 to bring balance to the electrical network. With waste gate 26 moved in an open direction the speed of the turbine will decrease.

As yet, no consideration has been given to the calibration network associated with the present control apparatus. A calibration network is provided in a proportioning system such as the type shown and is required to secure the proper relation between the means for selecting the pressure to be controlled and the actual pressure that will be maintained. In other words, it is desirable for each position of the manual selector 42 that there be a particular pressure maintained within the intake system of the engine 10. If the relation between the movement of the slider 42 or slider 78 and the resultant changes in volumes of air compressed by the compressor 14 assuming the desired ratio between control signal and waste gate movement exists were a linear relation it would be necessary to calibrate the control system at only one point and thus any other movement of the slider 42 would result in a pressure that would be desired for the movement made. Since, however, the relation between the movement of the slider 42 or 78 is not linear with respect to the pressure changes in the intake of the engine it is desirable to have a calibration of the system which will permit calibration at the two extreme positions of the slider 42. To accomplish this, I have provided two calibration networks for my control network with a fader potentiometer connected across one of those calibration potentiometers to variably select the calibration from one of the calibration potentiometers as the manual control slider 42 is moved through its range of operation.

The operation of my calibration network may best be understood by considering how the entire control network is calibrated. With the system in operation, the manual control slider 42 is moved to the extreme left position or to the minimum pressure position. When the slider 42 is in the left position, the slider 47 of the fader potentiometer is moved to its extreme right position since it is interconnected by suitable coupling means 48 to the slider 42. With the sliders 42 and 47 positioned as above, the control signal for the network 35 may be traced from the ground terminal 43 through slider 42, the manual control bridge, secondary tap 39 to tap 40, conductor 103, slider 47, conductor 104, slider 54, the second calibration bridge to center tap 52 of secondary 51 and the conductor 100. In reviewing the last traced circuit in network 35 it will be noted that the only network which may be adjusted to affect the controlling voltage of the network 35 will be the second calibration bridge and its associated slider 54. It will be noted that the first calibration network is completely bypassed by conductor 103. The second calibration network will then be used to select the pressure desired for the minimum position of the slider 42. To arrive at the second point of calibration of the control network, it is necessary to move the slider 42 to the extreme right hand position or to the maximum pressure position. When the slider 42 is in the right hand position the slider 47 of the fader potentiometer will be moved to its extreme left hand position. With the control slider in the last mentioned position, it may be seen that the output voltage in the network 35 may be traced from the ground terminal 43, slider 42, slide-wire 44, tap 45, slider 47, conductor 104, tap 54, slide-wire 53, secondary 51 to tap 52 and conductor 100. This last traced circuit may be seen to include the slide-wire resistor 44 and the slider 45 which may be considered as the maximum pressure calibration potentiometer. To obtain the desired pressure for the maximum position of the slider 42 the tap 45 of the maximum pressure calibration potentiometer is moved until the desired pressure setting is reached.

It may now be seen that the control network is calibrated for the minimum pressure position of slider 42 and a maximum pressure position of the slider 42. By providing a fader potentiometer connected directly across the maximum pressure calibration potentiometer, it is possible to variably adjust the calibration of the control network as the manual control slider 42 is moved between the maximum and minimum pressure positions. This is accomplished by the movement of the slider 47 which may be seen to variably select the amount of signal to be taken from the maximum pressure calibration network as the slider is moved from either of its two end positions.

From the above, it may be seen that a pressure control apparatus having a non-linear control effect has been provided wherein the apparatus may be calibrated at two end positions of operation to better maintain the pressure at the desired value. Further, a control apparatus has been provided wherein it is possible to have a fixed amount of a control condition at a first position of the control apparatus and a second amount of a control condition and at a second position of the control apparatus and providing therewith a selector to variably adjust the value of calibration between the first and second positions as the condition is variably selected.

Although I have described my invention in connection with a pressure control apparatus for an internal combustion engine, and while it is particularly well adapted for use there, it will be obvious to those skilled in the art that my invention could be applied to any apparatus where it is desirable to provide two point calibration with variable calibration between the two points. Therefore, I intend to be limited solely by the scope of the appended claims, in which I claim:

I claim as my invention:

1. In a condition controlling apparatus, a motor for positioning a condition regulating device, motor control means including a device responsive to a controlling condition for positioning said motor in accordance with the value of said condition, condition selecting means associated with said condition responsive means and comprising an adjustable element, said condition selecting means being effective when said adjustable element is moved to vary the position of the motor which is maintained by said motor control means, first and second calibration means associated with said condition selecting means for varying the position of the motor assumed for a given position of said adjustable element, and means controlled by said adjustable element for causing the position of said motor to be controlled by only said first calibration means when said adjustable element is at one end of its range of movement and by both said first and second calibration means when said adjustable element is at the other end of its range of movement so that it is possible to independently adjust the positions of said motor assumed when said adjusting member is at the opposite ends of its range of movement.

2. In a controlling apparatus for regulating the magnitude of a condition; condition regulating means being operative to regulate a condition; manual means for selecting the magnitude of the condition to be regulated; condition sensing means for sensing the magnitude of the condition; calibration means having an adjustment independent of said manual means for determining the relation between the magnitude of the condition selected by said manual means and the condition regulated by said regulating means; a complex balanceable electrical network having the individual adjustable impedance branches thereof common to each of said regulating means, said manual means, said calibration means and said sensing means; amplifier means connected to said network, said amplifier being operable to position said condition regulating means in accordance with the unbalance of said network; and coupling means interconnecting said manual selecting means and said calibration means to variably adjust the relation between the magnitude of the condition selected by said manual means and the condition regulated by said regulating means as said manual means is adjusted.

3. Condition controlling apparatus, said apparatus comprising manual means for selecting the magnitude of a condition, sensing means for sensing the magnitude of the condition selected by said manual means, condition regulating means for regulating the magnitude of a condition, calibration means for determining the relation between the position of said manual means and the magnitude of the condition regulated by said regulating means, separate adjusting means for each calibrating means, electrical means operably interconnecting said manual means and said regulating means so that said manual means is operable to position said regulating means, electrical means interconnecting said sensing means and said regulating means so that said sensing means will maintain said regulating means in a position to maintain the condition selected by said manual means, and coupling means interconnecting said calibration means and said manual means so that the said calibration means is operable to vary the controlling effect of said manual means on said regulating means as said manual means is adjusted.

4. In a condition controlling network being operable to maintain a condition, condition selecting means for variably selecting the magnitude of a condition to be maintained, and calibration means for adjusting the relation between the position of said condition selecting means and the magnitude of the condition to be controlled, said calibration means comprising a first resistance calibration network having an adjustment independent of said selecting means, a second resistance calibration network having an adjustment independent of said selecting means, means variably interconnecting said first and second networks and said condition selecting means of said controlling network to variably adjust the calibration of said controlling network in accordance with the positioning of said condition selecting means.

5. An electrical network comprising in combination, first and second alternating current power sources, a tap on each of said power sources, first and second potentiometers each having a variable tap, means interconnecting said first power source and said first potentiometer and said second power source and said second potentiometer to comprise first and second electrical circuits respectively, said circuits each having output terminals in the taps of said potentiometers and said power sources and having thereon alternating current phase and voltages determined by the positions of the taps of said potentiometers, a third potentiometer having a variable tap, means connecting said third potentiometer across the output terminals of the first of said electrical circuits, means connecting the tap of said third potentiometer to one of the output terminals of said second electrical circuit, network output terminals comprising the other of the output terminals of said second electrical circuit and either of the output terminals of said first electrical circuit, said network terminals having an output voltage thereon equal to the sum of the voltages of said first and second electrical circuits when the tap of said third potentiometer is in one position and equal to the voltage of said second electrical circuit when the tap of said third potentiometer is in a second position.

6. In a condition controlling apparatus, a motor for positioning a condition regulating device, a balanceable electrical network, means connecting said network to said motor so that said motor is operative to rebalance said network whenever said network is unbalanced and regulate a condition in accordance with the balance point of said network, electrical means for varying the balance of said network, said means comprising manually operated selecting means movable over a range of values, first and second calibration means having adjusting means independent of said selecting means for determining the relation between the position of said selecting means and the magnitude of a controlled condition, and means interconnecting said first and second calibration means with said selecting means so that the balance point of said network is determined by said selecting means and said first calibration means when said selecting means is in one extreme position and by said selecting means and said first and second calibration means when said selecting means is in the other extreme position.

7. In a condition controlling apparatus, an electrical balanceable network whose point of balance is a measure of the magnitude of a controlled condition, and means for varying the balance point of said network, said means comprising a manually operated condition selecting means movable over a range of values, first and second calibrating means having adjusting means independent of said selecting means whose adjustment varies the relation between the position of said selecting means and the magnitude of a controlled condition, and means interconnecting said first and second calibration means with said selecting means so that when said selecting means is in one extreme position the point of balance of said network will be determined by said selecting means and said first calibration means and when said selecting means is in the other extreme position the balance point of said network will be determined by said selecting means and said first and second calibration means.

8. In a condition controlling apparatus, an electrical balanceable network whose point of balance is a measure of the magnitude of a controlled condition, and means for varying the balance point of said network, said means comprising a first bridge having a manual adjustor for varying the balance of said bridge, first and second calibration bridges for determining the relation between the position of the manual adjustor of said first bridge and the magnitude of the controlled condition, and electrical means interconnecting said first and second calibration bridges and the manual adjustor of said first bridge so that the balance point of said network will be determined by the balance of said first bridge and said first calibration bridge when said adjustor is in one position and by the balance of said first bridge and said first and second calibration bridges when said adjustor is in a second position.

9. In a condition controlling apparatus, a motor for positioning a condition regulating device, a balanceable electrical network, means connecting said network to said motor so that said motor is operative to rebalance said network whenever said network is unbalanced, manually operated electrical means for varying the balance of said network to select a value of a controlled condition, a plurality of manually adjusted calibration means for determining the relation between unbalance of said network and the desired value of the control condition as selected by said manually operated means, each of said calibration means having an adjustment which is independent of said manually operated means, and mechanical means interconnecting said manually operated means and said calibration means so that the effect of said calibration means is variably adjusted upon movement of said manually operated means.

10. In a condition controlling network, manually operated condition selecting means, a plurality of manually adjusted calibrating means for independently selecting the relation between the position of said selecting means and the value of a control condition at a plurality of positions of said selecting means, and means interconnecting said calibrating means and said selecting means to variably adjust the effect of said calibrating means on said network as said selecting means is adjusted to vary the relation between the position of said selecting means and the controlled condition.

11. In a condition controlling network, an adjustable manually operated condition selecting means movable over a predetermined range, a plurality of manually adjusted calibrating means, each of said calibrating means having an adjustment independent of said selecting means and each effective to adjust the relation between the magnitude of the controlled condition with respect to the position of the selecting means at different adjustments of said selecting means on said range, and means interconnecting said selecting means and said calibrating means so that as said selecting means is moved over said range each of said calibrating means will be effective at said different adjustments.

ALEX B. CHUDYK.

REFERENCES CITED

The following references are of record in the file of this patent:

UNITED STATES PATENTS

| Number | Name | Date |
|---|---|---|
| 2,173,331 | Haines | Sept. 19, 1939 |
| 2,410,651 | Glass | Nov. 5, 1946 |